| | | | |
|---|---|---|---|
| United States Patent [19] | | [11] | 3,715,407 |
| Relles | | [45] | Feb. 6, 1973 |

[54] CHLORINATION OF KETONIC ACETYL GROUPS

[75] Inventor: Howard M. Relles, Saratoga, N.Y.

[73] Assignee: General Electric Company

[22] Filed: March 1, 1971

[21] Appl. No.: 119,839

Related U.S. Application Data

[63] Continuation-in-part of Ser. No. 67,211, Aug. 26, 1970, abandoned.

[52] U.S. Cl........260/668 R, 260/650 R, 260/651 R, 260/654 D
[51] Int. Cl.............................................C07c 15/04
[58] Field of Search.......................260/651 HA, 650, 654 R, 654 D, 260/668 R

[56] References Cited

UNITED STATES PATENTS

| | | | |
|---|---|---|---|
| 3,206,516 | 9/1965 | Ziegenbein et al. | 260/654 |
| 3,284,518 | 11/1966 | Ayers et al. | 260/651 HA |
| 3,349,151 | 10/1967 | Baranauckas et al. | 260/654 |
| 3,542,888 | 11/1970 | d'Ostrowick et al. | 260/668 |
| 3,594,423 | 7/1971 | Relles | 260/668 |
| 3,594,437 | 7/1971 | White | 260/668 |

*Primary Examiner*—Curtis R. Davis
*Attorney*—James W. Underwood, Joseph T. Cohen, Paul A. Frank, Charles T. Watts, Frank L. Neuhauser, Oscar B. Waddell and Joseph B. Forman

[57] ABSTRACT

$R_3PCl_2$ converts the carbonyl group of ketones to chlorine containing groups which, combined with dehydrochlorination methods, provides a new synthetic route for the production of acetylenic compounds useful for making polymers. The $R_3PO$ produced in the reaction is reconverted to $R_3PCl_2$ by reaction with phosgene thus providing an economical process for converting ketones to chlorine derivatives and from thence to acetylenic derivatives. Each R is $C_{1-20}$ alkyl, phenyl, lower alkylphenyl, halophenyl, phenoxyphenyl or naphthyl.

18 Claims, No Drawings

CHLORINATION OF KETONIC ACETYL GROUPS

This application is a continuation-in-part of my copending, but subsequently abandoned application, Ser. No. 67,211, filed Aug. 26, 1970, and assigned to the same assignee as the present application.

This invention relates to an improved process for converting the ketonic acetyl group to chlorine containing substituents. This invention further contemplates the process wherein the chlorine substituents are dehydrohalogenated to the corresponding acetylenic groups and further contemplates a process whereby only phosgene and the ketone need to be supplied to the reaction which produces the chlorinated derivatives thereby enabling such chlorine-containing derivatives to be made in a continuous process. More particularly, this invention relates to the conversion of the ketonic acetyl group of methyl ketones, i.e., ketones where the acetyl group

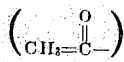

is the ketonic moiety, to chlorine-containing substituents selected from the group consisting of $\alpha,\alpha$-dichloroethyl

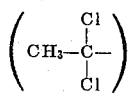

$\alpha$-chlorovinyl

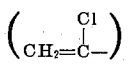

and $\alpha$-chloroethylidene

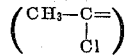

and to the dehydro-halogenation of these chlorine-containing substituents to the corresponding acetylenic group. The balance of the ketonic moiety can be any aliphatic or aromatic hydrocarbon or halohydrocarbon, or any aryl or haloaryl ether, i.e., the ether oxygen is directly bonded to a carbon atom in an aromatic ring.

Polymeric acetylenes and a process for producing the same are disclosed in U.S. Pat. No. 3,300,456—Allan S. Hay. The polymers and copolymers of diethynyl compounds are an extremely interesting group of polymers since they contain a very high percentage by weight of carbon, for example, the polymers and copolymers from diethynylbenzenes contain over 90 percent by weight carbon. The monoethynyl compounds, for example, methylacetylene, phenylacetylene, etc., can be used as chain-stoppers to regulate the molecular weight of the polymers and copolymers from diethynyl compounds. Furthermore, the mono- and diethynyl compounds are useful for making photosensitive compositions as disclosed in the copending application of Allan S. Hay, Ser. No. 764,287, filed now U.S. Pat. No. 3,594,175 Oct. 1, 1968 and assigned to the same assignee as the present invention.

Because of the wide utility of the acetylenic polymers and copolymers as disclosed the aforementioned patents, it would be highly desirable to have an economical process for producing the acetylenic compounds required as starting materials for the polymers and for the chain-terminating, molecular weight regulators.

Generally, ketones react with halogenating agents to produce haloketones, for example, acetone reacts with halogenating agents to produce $\alpha$-haloacetone. Unlike phosphorus pentabromide which brominates ketones to give $\alpha$-bromoketones, phosphorus pentachloride reacts with ketones to produce predominantly the gem-dichloride wherein two chlorines replace the oxygen of the ketone. Some chloro-olefins and hydrogen chloride as well as other products (vide infra) are also produced. In the case of mixed aryl alkyl ketones, i.e., the ketonic carbonyl group is between an aryl and alkyl group, the $\alpha$-chloroolefins are generally the chief product. In the case of dialkyl ketones, the dehydrohalogenation reaction can involve either or both alkyl groups. Since the gem-dichlorides and the chloroolefins can be readily dehydrohalongenated to the corresponding acetylenic compounds, the mixture does not have to be separated prior to dehydrohalogenation.

From a laboratory preparation standpoint, the use of phosphorus pentachloride for producing the chloro derivatives followed by dehydrohalogenation is a satisfactory method for converting ketones to the corresponding acetylenes, see for example, Chapter I titled "Synthesis of Acetylenes," written by Thomas L. Jacobs in Volume 5 of *Organic Reactions*, John Wiley & Sons, Inc., New York (1949) and the references cited therein and Methods 43 and 72 and the literature references cited therein in the book "Synthetic Organic Chemistry" by Romeo B. Wagner and Harry D. Zook, John Wiley & Sons, Inc., New York (1953). Unfortunately, because of the high cost of phosphorus pentachloride since only two out of the five chlorines can be utilized in the chlorination reaction, because of complicating side reactions, and because the resulting phosphorus oxychloride cannot be readily reconverted to phosphorus pentachloride (see for example, U.S. Pat No. 2,907,798 and German patent 492,061), this method is too expensive to be commercially feasible for the conversion of ketonic acetyl compounds to their corresponding gem-dichloroethyl and chloroethylenic derivatives useful as intermediates for preparing acetylenic derivatives.

German patent 1,192,205 discloses that phosgene or thionyl chloride will react with triphenylphosphine oxide to produce dichlorotriphenylphosphorane. Other aryl groups can be substituted for the phenyl group and triphenylarsine oxide and triphenylstibene oxide can be substituted for the triphenylphosphine oxide. Horner et al., Liebigs Ann. 626, 26 (1959) prepared dichlorotriphenylphosphorane by reaction of chlorine with triphenylphosphine. They found that a suspension of dichlorotriphenylphosphorane in refluxing benzene, in the presence of triethylamine, reacted with benzaldehyde to produce a 59 percent yield of benzal chloride or with cyclohexanone to produce a 45 percent yield of 1-chloro-cyclohexene. However, Francis Freenor, III, in his Ph.D. thesis, "Ether Cleavage by Triphenylphosphine Dibromide and Related Reactions," Dissertation 68—12,689 University Microfilms, Inc., Ann Arbor (1968), reports that no volatile products are obtained from the reaction of either cyclohexanone or acetone with triphenylophosphine dibromide (dibromotriphenylphosphorane) in N,N-dimethylformamide, even when heated, but that the ketone was consumed. It is not self-evident whether the difference between the results of Freenor and Horner et al. with cyclohexanone is due to the different halogen in the phosphorane or the lack of triethylamine in the Freenor reaction.

Insofar as I am aware, the only reaction of phosgene directly with a ketone at room temperature was reported by Matuszak in J. Am. Chem. Soc., 56, 2007 (1934). He did not identify the compound which he obtained but stated that the properties which he did determine corresponded more closely to those which might be expected for isopropenyl-chloroformate than to other possible products. This compound would be the chloroformate ester of the enol form of acetone. Even at elevated temperatures, phosgene does not react with ketones to replace the carbonyl oxygen with halogen as does occur in the reaction with phosphorus pentachloride. Instead, aldol type condensations occur leading to a mixture of complex products.

Because phosgene is readily available in large commercial quantities at a very low price, is an easily handled gas despite its toxicity, and is not nearly as vigorous in its reactions as is gaseous chlorine, etc., it would be highly desirable to use this material as a cheap and easily useable source of chlorine in the conversion of ketonic acetyl groups to the above-mentioned halo groups to produce intermediates which can be dehydrohalogenated to their corresponding acetylenic derivatives. Unexpectedly, I have found that although phosgene cannot be used directly, dichlorophosphoranes having the formula $R_3PCl_2$, obtained by the reaction of phosgene with phosphine oxides having the formula $R_3PO$, can be used to convert ketonic acetyl groups to $\alpha,\alpha$-dichloroethyl groups, $\alpha$-chlorovinyl groups and $\alpha$-chloroethylidene groups. In the above formulas, each R is independently selected from the group consisting of $C_{1-20}$ alkyl, phenyl, lower alkyl substituted phenyl, halophenyl, phenoxyphenyl and naphthyl. It is to be understood that the terms "-dichlorophosphorane(s)" and "phosphine oxide(s)" used hereinafter for brevity, will refer to the compounds having the above formulas.

Typical examples of the $C_{1-20}$ alkyl groups which R can be are methyl, ethyl, propyl, isopropyl, the various butyl isomers, e.g., n-butyl, sec-butyl, tert-butyl, etc., the various amyl isomers, the various hexyl isomers, including cyclohexyl, the various heptyl isomers, the various octyl isomers, the various decyl isomers, the various dodecyl isomers, the various octadecyl isomers, the various eicosyl isomers, etc. The lower alkyl substituted phenyl groups can be a phenyl group having from one to five, preferably one to two, lower alkyl substituents, e.g., any of the above $C_{1-8}$ alkyl groups. The halophenyl groups can be a phenyl group having from one to five, preferably one to two halogens substituted on the phenyl nucleus, e.g., chlorine, bromine, iodine, fluorine, preferably chlorine. Preferably the phenoxyphenyl groups are those in which the phenyl group has one phenoxysubstituent. However, from two to five such substituents may be present, if desired.

The chlorine containing substituent produced, of those named above, is dependent on the nature of the ketone, and to some extent on the reaction conditions. These are not critical parameters, since they are within the knowledge and control of a skilled person carrying out the reaction and furthermore, all three of these chlorinated groups can be converted to their corresponding acetylenic groups with the use of dehydrohalogenating agents under dehydrohalogenating conditions. Here again, as is well known in the art, the particular dehydrohalogenating agents chosen can influence the actual position of the acetylenic group, i.e., whether it is a terminal acetylenic group or between the second and third carbon atom of an alkyl chain.

When the ketone is an acetyl substituted aromatic compound, for example acetophenone, diacetylbenzene, acetyl-naphthalene, p-chloroacetophenone, acetyldiphenyl ether (phenoxyacetophenone), diacetyldiphenyl either, etc., the acetyl groups will be converted by reaction with the dichlorophosphorane to a mixture of $\alpha$-chlorovinyl and $\alpha,\alpha$-dichloroethyl groups with the former predominating. Because the aryl substituent is directly attached to the ketonic carbonyl group, it is impossible for the $\alpha$-chloroethylidene group to form with these ketones. When the ketone is an acetyl substituted aliphatic compound, all three groups can and do form except in the case of acetone where of course it is impossible to form other than the $\alpha,\alpha$-dichloroethyl and $\alpha$-chlorovinyl derivatives. In this respect, the chlorine compounds formed are the same, but not necessarily in the same proportion, as would be formed if phosphorus pentachloride had been used as the chlorinating agent. The course of this reaction, is extremely well documented and the course of my reaction with aliphatic ketones will be readily apparent to those skilled in the art based on this known reaction with phosphorus pentachloride. However, the yield of the desired chlorinated products is essentially quantitative in my reaction based on the amount of ketone consumed with no evidence of any by-products. In marked contrast, the reaction with phosphorus pentachloride gives low yields of the desired chlorinated products, in the range of 40–60 weight percent based on the amount of ketone consumed, and considerable amounts of undesirable by-products, especially chlorinated ketones resulting from chlorination of the alkyl group rather than the ketonic carbonyl group, and aldol condensation products arising because of the acidity of the phosphorus oxychloride produced, etc. The diverse and complex nature of the composition of the reaction mixture makes separation of the desired chlorinated compounds from the undesirable by-products extremely difficult.

My reaction can be carried out at ambient temperature and at ambient pressure if desired, but is speeded up by heating at elevated temperatures. In the case of lower aliphatic ketones, for example acetone, methyl ethyl ketone, etc., where the monochlorovinyl compounds produced are extremely volatile because of their very low boiling point, it is desirable to carry out the reaction at room temperature unless provision is made for sufficient cooling capacity and low enough temperature in the condenser to condense the very volatile α-chlorovinyl compounds. Where volatility is not a problem, the reaction can be hastened by heating up to the reflux temperature of the reaction mixture at or above atmospheric pressure.

The reaction between the phosphine oxide and phosgene to produce the dichlorophosphorane is greatly hastened if a solvent for the phosphine oxide is used. The solvent, of course, should be inert and nonreactive with phosgene, the phosphine oxide or the dichlorophosphorane product and liquid at the temperature at which it is used in the process. Highly polar solvents are required to dissolve the phosphine oxides. Typical solvents which I can use are the nitriles, for example acetonitrile, propionitrile, butyronitrile, benzonitrile, etc., or the halogenated hydrocarbons, for example chloroform, trichloroethylene, chlorinated benzenes, chlorinated biphenyls, chlorinated diphenyl ethers, etc. As will be explained later, acetonitrile is an ideal solvent to be used. Mixtures of these solvents or mixtures of one or more of these solvents with other liquids which are not solvents or only poor solvents can also be used.

The solubility of both the phosphine oxide and the dichlorophosphorane in a particular solvent is dependent on the particular R substituents and the temperature. In general, a phosphorane is more soluble than its corresponding phosphine oxide. Either of these compounds having alkyl, phenyl, phenoxyphenyl or alkyl substituted phenyl substituents are more soluble than those having halophenyl substituents which in turn are more soluble than those having naphthyl substituents. Heating increases the solubility of all of these compounds in a particular solvent.

As will be more evident later, complete solubility of the phosphine oxide and its corresponding dichlorophosphorane at room temperature is desirable, but not necessary. Those phosphine oxides and phosphoranes which are less soluble require a greater amount of solvent, heating or both to dissolve a given amount. The speed of reaction of the phosphine oxide with phosgene and of the dichlorophosphorane with the ketone is increased by having the reaction mixture homogeneous, by increasing the concentration of the reactants dissolved in the reaction mixture and by heating the reaction mixture.

As will be shown in the specific examples, another factor governing the rate of reaction of the dichlorophosphorane with ketones is the nature of the substituents. Electron donating substituents decrease the rate while electron withdrawing substituents increase the rate of reaction. This is true even for substituents on the aryl nucleus of a substituent. For example, alkyl groups, either directly attached to the phosphorus atom or as a substituent on an aryl nucleus which is attached to the phosphorus atom (e.g., alkylphenyl), alkoxy and aryloxy substituents on the aryl nucleus, etc., reduce the rate compared with dichlorotriphenylphosphorane, whereas halo substituents on the aryl nucleus increase the rate of reaction of the corresponding dichlorophosphoranes.

By taking advantage of one or more of the above factors, the optimum reaction conditions for any of the above phosphine oxides or dichlorophosphoranes can be readily attained. Consideration of the same factors also leads to the conclusion that triarylphosphine oxides and diclorortriarylphosphoranes, wherein the aryl nuclei are unsubstituted or halo substituted, will be the preferred species of reactants. Although dichlorotriphenylphosphorane is less reactive with ketones than the same phosphorane where one or more of the phenyl substituents have one or more halo substituents, this difference in reactivity is easily compensated for by using a higher reaction temperature. For example, using acetonitrile as the solvent, at 180°C. under the autogeneous pressure of the reaction mixture, the reaction of dichlorotriphenylphosphorane with various ketones is complete in one hour. The solubilities of both triphenyl-phosphine oxide and dichlorotriphenylphosphorane in all of the suitable solvents are greater than the solubilities of their halophenyl analogues. This not only permits more concentrated, homogeneous solutions to be used at a given temperature, which can also be used to compensate for the slower reaction rate, but also permits cooling of the reaction mixture to room temperature after reaction with the ketone without precipitation of the triphenylphosphine oxide. This greatly aids in the separation of the chlorinated products from the balance of the reaction mixture, especially in the extraction procedure to be discussed later, because of the relatively low boiling points of the extractants. A homogeneous reaction mixture is desirable at all times during the continuous process to be described hereinafter. Therefore, triphenylphosphine oxide and dichlorotriphenylphosphorane are preferred over their halophenyl analogues.

The reaction between phosgene and the phosphine oxide produces carbon dioxide. The evolution of carbon dioxide can be used as a monitor to detect when sufficient phosgene has been introduced into the reaction mixture to convert all of the phosphine oxide to the dichlorophosphorane. Alternatively, this can be followed by determination of the amount of phosgene introduced by use of a flowmeter, by weight difference of either the reaction mixture or the phosgene container, etc. This reaction is exothermic and therefore it is generally desirable to provide cooling during the phosgene addition or to introduce the phosgene at a rate designed to control the exothermic reaction. Since phosgene itself, if present, will cause undesirable side reactions with the ketones at elevated temperatures, any excess phosgene introduced in making the dichlorophosphorane should be removed either before the introduction of the ketonic acetyl compound or the equipment used should permit the phosgene to escape from the reaction mixture as it is heated, if elevated temperatures are to be used for the reaction between the dichlorophosphorane and the ketonic acetyl compounds. In either case, phosgene is easily removed by refluxing the reaction mixture with a water-cooled condenser open to the atmosphere, preferable through a drying tube, since under these conditions the phosgene will escape. Alternatively, the excess phosgene can be removed by a flow of inert gas through the reaction medium. Dry air or nitrogen is conveniently used for this purpose.

In the reaction between the dichlorophosphorane and the ketonic acetyl compound, the dichlorophosphorane is converted to the corresponding phosphine oxide which can be separated from the chlorinated reaction products and reacted with an additional amount of phosgene permitting its reuse in the process. I have discovered a convenient means of doing this by using acetonitrile as the solvent for the phosphine oxide initially in the reaction with phosgene, as well as the reaction between the dichlorophosphorane and the ketonic acetyl compound.

Acetonitrile is immiscible with liquid alkanes, for example pentane, hexane, heptane, the various petroleum fractions known as petroleum ethers, etc. and is heavier so that it forms the lower layer when mixed with them. These liquid alkanes are good solvents for the chlorinated reaction products but are very poor solvents for the phosphine oxides. They can be used therefore to extract the desired reaction products from the reaction mixture, leaving essentially all of the phosphine oxide dissolved or as a precipitate in the acetonitrile layer. The acetonitrile layer and the phosphine oxide is recycled back to the initial step in the process and reacted with phosgene. The desired chlorinated products are readily separated from the liquid alkane layer by fractional distillation permitting the liquid alkane to be recycled to the extraction step. By this scheme, I have provided a continuous process for conversion of the ketonic acetyl compounds to their chlorinated products with only phosgene and the ketonic acetyl compound being consumed in the reaction with the capability of recovering and reusing the other materials.

It will be readily apparent that if a precipitate of phosphine oxide is present in the acetonitrile layer, that it is more difficult to perform the above-described extraction step than if no precipitate were present. This is especially true in the continuous process where the precipitate would necessitate the return of both the acetonitrile and the precipitated phosphine oxide back to the reactor for reaction with phosgene. Transfers of such as a slurry can be done, but not as conveniently as when a homogeneous solution is transferred.

In a few cases, where aliphatic ketones are chlorinated by my process, the chlorinated products are the most volatile component of the reaction mixture, in fact some are gases at room temperature and atmospheric pressure. In these cases, no extraction step is required since the gases can be condensed as they autogeneously distill from the reaction mixture and the liquid products can be distilled from the balance of the reaction mixture. The reaction should be run so as to convert all of the ketone to chlorinated products so that the residual reaction mixture will contain only the solvent, the phosphine oxide and any excess dichlorophosphorane that was present. Since my reaction produces no by-products which I have been able to detect, the residual reaction mixture, without further treatment is ready to be reacted with phosgene and reused in my process. Under these conditions, it does not matter whether some of the phosphine oxide precipitates from the reaction mixture.

Although only one mole of dichlorophosphorane is required for each equivalent of ketonic acetyl groups, I have found that there are advantages to using an excess of the dichlorophosphorane. One advantage is that the reaction with the ketone is hastened to completion. Another is that the excess dichlorophosphorane, like the phosphine oxide, remains with the acetonitrile in the above-described continuous process and increases the amount of phosphine oxide which can be dissolved for a given volume of acetonitrile. The excess amount, once supplied, is not lost in the reaction but is recycled back to the starting point along with the phosphine oxide produced in the ketone reaction. For these reasons, I prefer to use an excess of dichlorophosphorane and generally prefer to use up to 2 or more moles of dichlorophosphorane for each equivalent of ketonic acetyl group in the compound.

The chloro compounds prepared by my reaction are readily dehydrohalongenated with a wide variety of dehydrohalogenating agents well-known to be capable of dehydrohalogenating both dihaloalkanes and haloolefins to acetylenes when used under their known dehydrohalogenating conditions. These may be aqueous or organic solvent solutions or suspensions of alkali metal hydroxides, alkali metal alkoxides, alkali metal alkyls, alkali metal aryls, alkali metal amides either as suspensions in organic liquids or in liquid ammonia, etc.

As is evident to those skilled in the art, the dehydrohalogenation of an $\alpha$-chlorovinyl group can proceed in different ways depending on the nature of the carbon atom to which the $\alpha$-chlorovinyl group is attached. If it is attached to an aromatic carbon atom, then only the corresponding ethynyl derivative will be produced, i.e., dehydrohalogenation of $\alpha$-chlorovinylbenzene, also known as $\alpha$-chlorostyrene, only produces phenylacetylene. However, if the $\alpha$-chlorovinyl group is on an aliphatic carbon atom, also having a hydrogen atom on it, the dehydrohalogenation can lead to two products, either the corresponding ethynyl compound or the corresponding allene (1,2-diene) derivative.

Dehydrohalogenation of the $\alpha,\alpha$-dichloroethyl groups follows the same path as dehydrohalogenation of the $\alpha$-chlorovinyl group. As explained previously, dehydrohalogenation of the $\alpha$-chloroethylidene group is confined to those chloro compounds arising out of the reaction of aliphatic ketones. Dehydrohalogenation of these compounds produces either an acetylenic compound where the acetylenic bond is between the second and third carbon atom, or a 1,2-diene structure.

In those cases, where two dehydrohalogenation products are possible, the actual product is a mixture of the two with the ratio of the two being dependent on the particular dehydrohalogenating agent used and the particular dehydrohalogenation conditions. Generally, alkali metal hydroxides and alkali metal amides convert any allene or 1,2-diene compounds to the corresponding acetylenic compound. Furthermore, alkali metal amides, and especially sodamide (sodium amide) not only favors the formation of acetylenic groups but also favors the making of terminal acetylenic groups, i.e., the acetylenic group is between the first and second carbon atom, even though the initial acetylenic group is between the second and third carbon atom.

The use of various dehydrohalogenating agents, the effect on the particular product obtained, the conditions to be used, etc., are well known in the art. See for example, Method 43 in the above reference book by Romeo B. Wagner and Harry D. Zook and the references cited therein, the book "Acetylenes and Allenes" by Thomas F. Rutledge, Reinhold Book Corporation, New York (1969), especially pages 35 to 57, the book "Acetylenic Compounds" by Thomas F. Rutledge, Reinhold Book Corporation, New York (1968), especially pages 22–44, the book "The Chemistry of Alkenes" edited by Saul Patai, Interscience Publishers, New York (1964), especially Chapter 13, by H. Fisher and the book "Chemistry of Acetylenes" edited by Heinz G. Viehe, Marcel Dekker, New York (1969), especially Chapter 2. The above references and their footnote references hereby are incorporated by reference for their teaching as to the types of chlorinated materials and dehydrohalogenated products obtained and the effect of reagents, reaction conditions and other parameters that govern the types of products.

The reaction of dichlorophosphoranes is broadly applicable to all ketones for preparing halogenated compounds which are useful, per se, in organic synthesis or for preparing acetylenic derivatives by dehydrohalogenation. However, it is obvious from what has been said above that the reaction becomes more complex unless there is at least one methyl group attached directly to the ketonic carbonyl group, i.e., the ketone can be described as a methyl ketone or as a molecule having a ketonic acetyl group. Furthermore, the acetylenic compounds prepared by dehydrohalogenation of the chlorinated compounds, although useful chemical compounds because of the acetylenic group, cannot be used as monomers for preparing the polyacetylenes since such monomers must have terminal acetylenic groups, i.e., there must be a hydrogen on the terminal carbon atom which is joined to the adjacent carbon atom with the acetylenic triple bond ($-C \equiv CH$).

For these reasons, my invention, in its preferred embodiments, is limited to those ketones wherein the ketonic carbonyl group is present as an acetyl group, hereinafter referred to as ketonic acetyl group. There may be one or more such ketonic acetyl groups present in the molecule but for simplicity's sake, availability of starting materials, and desirability of the resulting chlorine-containing derivatives and acetylenic derivatives thereof, the compounds generally have no more than three and usually one or two ketonic acetyl groups. The balance of the molecule, as long as it is non-reactive with any of the reactant or product groups, can be any desired moiety. However, from a practical standpoint it has no more than 20 carbon atoms and is selected from the group consisting of hydrocarbon, halohydrocarbon, aryl ether and haloaryl ether, i.e., the balance of the molecule can be aliphatic hydrocarbon, either saturated or having olefinic or acetylenic unsaturation, preferably saturated or olefinic, aryl, aliphatic hydrocarbon substituted aryl, aryl substituted aliphatic hydrocarbon, the same hydrocarbons wherein one or more of the hydrogens have been replaced with a halogen, preferably chlorine, and, in the case of polynuclear aryls and haloaryls, wherein two or more aromatic rings are joined together they can be joined together with an intervening oxygen atom in the form of aryl ethers and haloaryl ethers.

Typical, but not limiting examples of ketones which I may use are: acetone, methyl ethyl ketone, methyl n-propyl ketone, methyl isopropyl ketone, methyl n-butyl ketone, methyl isobutyl ketone, methyl s-butyl ketone, methyl t-butyl ketone, methyl n-amyl ketone, methyl isoamyl ketone, 4-methyl-2-hexanone, 3-methyl-2-hexanone, 3-ethyl-2-pentanone, methyl neopentyl ketone, methyl t-amyl ketone, 3,4-dimethyl-2-pentanone, 3-acetyldibenzofuran, methyl n-hexyl ketone, methyl isohexyl ketone, 3-methyl-2-heptanone, 3,4-dimethyl-2-hexanone, 4-ethyl-2-hexanone, 3-methyl-3-ethyl-2-pentanone, methyl n-heptyl ketone, 4-methyl-2-octanone, 3-methyl-3-ethyl-2-hexanone, methyl n-octyl ketone, methyl n-decyl ketone, methyl n-undecyl ketone, methyl n-heptadecyl ketone, 2-heneicanone, methyl cyclopropyl ketone, methyl cyclobutyl ketone, methyl cyclopentyl ketone, 2-methyl-5-ethylcyclo-pentanone, methyl cyclohexyl ketone, cyclohexylacetone, α-methyl-α-cyclopentylacetone, acetophenone, methyl benzyl ketone, o-methylacetophenone, m-methylacetophenone, p-methyl-acetophenone, benzylacetone, 3-phenyl-2-butanone, 2-aceto-p-cymene, o-ethylacetophenone, m-ethylacetophenone, p-ethyl-acetophenone, 2,4-dimethylacetophenone, 2,5-dimethylaceto-phenone, 3,4-dimethylacetophenone, 3,5-dimethylacetophenone, 3-phenyl-2-pentanone, 4-phenyl-2-pentanone, 5-phenyl-2-pentanone, 3-methyl-3-phenyl-2-butanone, 3-methyl-4-phenyl-2-butanone, 2,4,5-trimethylacetophenone, 2,4,6-trimethylacetophenone, 5-acetylindane, mesitylacetone, p-n-butylacetopheonone, p-isobutylacetophenone, p-s-butylacetophenone, p-t-butylacetophenone, 2-methyl-5-isopropylacetophenone, acetodurene, acetoisodurene, acetoprehnitene, methyl α-naphthyl ketone, methyl β-naphthyl ketone, 6-acetyltetralin, p-n-amylacetophenone, p-isoamylacetophenone, p-s-amylaceto-phenone, p-t-amylacetophenone, acetopentamethylbenzene, 4-phenylhexahydroacetophenone, p-cyclohexylacetophenone, 2-acetylbiphenyl, 3-acetylbiphenyl, 4-acetylbiphenyl, 1-acetoacenaphthene, benzylacetophenone, α,α-diphenylacetone, 2-acetylfluorene, 9-acetylfluorene, 1-acetylphenanthrene, 2-acetylphenanthrene, 3-acetylphenanthrene, 9-acetylphenanthrene, 9-acetylanthracene, acetylacetone, acetonylacetone, methyl-diacetylmethane, triacetylmethane, 3-methyl-2,5-hexanedione, diacetylethylmethane, isopropyldiacetylmethane, n-butyl-diacetylemthane, diacetyldiethylmethane, 3-acetyl-2,6-heptane-dione, 1-adamantyl methyl ketone, o-diacetylbenzene, m-diacetylbenzene, p-diacetylbenzene, 3-phenyl-2,4-pentanedione, 1,3,5-triacetylbenzene, methyl vinyl ketone, methyl propenyl ketone, methyl isopropenyl ketone, 5-hexen-2-one, 1,2-diacetyl-ethylene, 3-methyl-3-penten-2-one, 4-methyl-3-penten-2-one, trans-3-hepten-2-one, 5-hepten-2-one, 3-methyl-1-hexen-5-one, 5-methyl-5-hexen-2-one, 3,4-dimethyl-3-penten-2-one, 3,4-dimethyl-3-penten-2-one, 3,4-dimethyl-4-penten-2-one, 3-methyl-3-hepten-2-one, 3-methyl-3-hepten-5-one, 2-methyl-2,5-heptadien-4-one, 3-ethyl-5-hexen-2-one, 3,4-dimethyl-3-hexen-2-one, 5,5-dimethyl-3-hexen-2-one, 2,3-dimethyl-2-hepten-6-one, 3-propyl-3-hexen-2-one, 1-acetyl-1-cyclopen-tene, 1-cyclopentenylacetone, 1-acetyl-1-cyclohexene, (2-cyclopenten-1-yl)acetone, 6,6-dimethyl-1-acetyl-1-cyclohexene, benzalacetone, 1-phenyl-1-hexen-5-one, 3-phenyl-1-hexen-5-one, 1-naphthalacetone, 2-naphthalacetone, methyl ethynyl ketone, 3-pentyn-2-one, 3-octyn-2-one, 3-nonyn-2- one, 4-phenyl-3-butyn-2-one, 4-(o-tolyl)-3-butyn-2-one, 2,2-dimethyl-3-hexyn-5-one, 1-cyclohexyl-1-butyn-3-one, fluoroacetone, chloroacetone, bromacetone, 1,1,1-tribromoacetone, 1,1,1-trifluoroacetone, 1,1,1-trichloroacetone, methyl $\alpha$-chloro-ethyl ketone, methyl $\alpha$-bromoethyl ketone, methyl $\beta$-chloroethyl ketone, methyl $\alpha,\beta$-dichloroethyl ketone, 2-bromo-2-penten-4-one, 4-bromo-3-octen-2-one, methyl $\alpha$-chloro-n-propyl ketone, methyl $\gamma$-chloro-n-propyl ketone, methyl $\alpha$-bromo-n-propyl ketone, methyl $\alpha$-chloroisopropyl ketone, methyl $\alpha$-bromoisopropyl ketone, 4-bromo-5-chloro-2-pentanone, 5-chloro-2-pentanone, 3,4-dibromo-3-methyl-2-butanone, 6-bromo-2-hexanone, 2-chloro-2-methyl-4-pentanone, 3,4-dibromo-3-methyl-2-pentanone, 3-bromo-1,3-hexadien-5-one, 3-bromo-2-heptanone, 1-bromo-6-heptanone, 3-methyl-6-bromo-2-hexanone, 3,4-dimethyl-4-chloro-2-pentanone, methyl $\alpha$-bromocyclohexyl ketone, 1-acetyl-1,2-dibromo-cyclohexane, o-chloroacetophenone, o-bromoacetophenone, m-chloroacetophenone, m-bromoacetophenone, m-iodoacetophenone, p-fluoroacetophenone, p-chloroacetophenone, p-bromoacetophenone, p-iodoacetophenone, $\alpha$-chloro-$\alpha$-phenylacetone, $\alpha$-bromo-$\alpha$-phenyl-acetone, o-chlorobenzyl methyl ketone, p-chlorobenzyl methyl ketone, p-acetobenzyl bromide, m-trifluoromethylacetophenone, 4-phenyl-3-chloro-2-butanone, 4-phenyl-3-bromo-2-butanone, benzalacetone dichloride, benzalacetone dibromide, p-phenoxy-acetophnone, p-(chlorophenoxy)acetophenone, acetylferrocene, etc.

The course of the reaction is readily followed by nmr spectroscopy noting the disappearance of the carbonyl group and the appearance of the $\alpha,\alpha$-dichloroethyl group, the $\alpha$-chlorovinyl group and, where produced, the $\alpha$-chloroethylidene group. One might expect that the $\alpha$-chloro unsaturated groups come from dehydrohalogenation of the dichloroethyl groups. However, I have found that, in addition to being formed by dehydrohalogenation of the dichloroethyl group, they are formed directly, since in monitoring my reactions, I have been able to detect the unsaturated chlorine-containing groups as early as the saturated chlorine-containing groups, and the concentration of both increases with time until late in the reaction when essentially all of the ketone has reacted. Then the unsaturated chlorine-containing groups continue to increase especially when the reaction is carried out at elevated temperatures, at the expense of the $\alpha,\alpha$-dichloroethyl groups. There is no necessity for carrying out the reaction after all of the ketonic acetyl groups have reacted with the dichlorophosphorane. However, if the products are to be dehydrohalogenated to the acetylenic compounds, or it is desired to produce the $\alpha$-chlorovinyl or $\alpha$-chloro-ethylidene compounds, then the amount of dehydrohalogenating agent can be conserved by continuing the reaction to dehydrohalogenate the $\alpha,\alpha$-dichloroethyl groups, which occurs merely by heating the reaction mixture, to the desired extent or until no more dehydrohalogenation occurs by this means.

In order that those skilled in the art may better understand my invention the following examples are given by way of illustration and not by way of limitation. In all of the examples, parts are by weight unless stated otherwise and temperatures are given in degrees centigrade.

EXAMPLE 1

A solution of 8.11 g. of m-diacetylbenzene and 27.82 g. of triphenylphosphine oxide in 50 ml. of anhydrous acetonitrile was placed in a reaction vessel equipped with a water-cooled condenser, stirrer, thermometer, and gas inlet tube. While cooling the reaction vessel with a water bath, phosgene was introduced into the vapor phase of the reaction vessel from where it was rapidly dissolved in the liquid phase causing an exothermic reaction with evolution of carbon dioxide. After approximately 10 minutes, the evolution of carbon dioxide had ceased and the flow of phosgene was stopped. The reaction mixture was heated to reflux while permitting any excess phosgene to escape through the top of the condenser which was open to the atmosphere through a drying tube filled with desiccant. After 18.5 hours of heating at reflux, an nmr spectrum of the reaction mixture showed that it contained much triphenylphosphine oxide, some dichlorotriphenylphosphorane, some hydrogen chloride and that the ratio of $\alpha$-chlorovinyl groups to acetyl groups attached to an aromatic nucleus was in the ratio of 86/14.

While cooling the reaction mixture in the cold water bath, phosgene again was introduced, until carbon dioxide evolution ceased, to reconvert the triphenylphosphine oxide to dichlorotriphenylphosphorane, which again required about 10 minutes. The system again was heated to reflux for an additional 8 hours at which time the nmr spectrum showed the complete absence of acetyl groups and the ratio of $\alpha$-chlorovinyl groups to triphenylphosphorus moieties was 1/1 which is the theoretical ratio for a 100 percent yield of m-bis($\alpha$-chlorovinyl)benzene from m-diacetylbenzene.

The reaction mixture was mixed with 250 ml. of water to which 20 g. of 50 percent aqueous sodium hydroxide was added to hydrolyze all of the remaining dichlorotriphenyl-phosphorane to triphenylphosphine oxide. After adding 250 ml. of chloroform and vigorously shaking the mixture, the aqueous layer was separated and discarded. The organic layer was washed with water and dried over anhydrous magnesium sulphate and filtered. A sample of the filtrate was analyzed by vapor phase chromatography and found to contain only the two expected products.

All of the solvent was removed from the filtrate under vacuum, first at room temperature and finally at 50° C., leaving 37.6 g. of a mixture of a solid and liquid. This was dissolved in 200 ml. of carbon tetrachloride by heating at 50° C., after which 500 ml. of pentane was added to produce a copious precipitate which was removed by filtration and washed two times with 100 ml. portions of pentane. After removing the last traces of pentane by heating in a vacuum desiccator at approximately 60° C., there was obtained 24.3 g. of triphenylphosphine oxide, melting point 155°–156.5° C. (literature melting point 156° C.). Comparison of this product with an authentic sample of triphenylphosphine oxide by vapor phase chromatography and infrared spectroscopy showed them to be identical. Complete removal of the solvent under vacuum from the combined carbon tetrachloride-pentane filtrates from above and trituration of the residue with 300 ml.

of pentane gave an additional 1.81 g. of triphenylphosphine oxide so that the total recovery was 26.11 g., or 94 percent of the theoretical amount based on the starting quantity. The pentane filtrate from the latter trituration was treated with charcoal to remove a small amount of color, filtered and freed of solvent under vacuum. There was obtained 9.07 g. of a liquid product which was shown by vapor phase chromatography, nmr spectroscopy and mass spectroscopy to be m-bis($\alpha$-chlorovinyl)benzene containing 0.59 g. of triphenylphosphine oxide which could be removed by further purification. However, since it does not interfere with the dehydrohalogenation of this compound to diethynylbenzene, as illustrated hereinafter, complete removal is only desirable for economic reasons. Where this is desired it is much easier to do this in the continuous process which will be illustrated hereinafter.

EXAMPLE 2

Sodamide was made by adding 0.25 g. of sodium metal and 0.1 g. of hydrated ferric nitrate to approximately 200 ml. of liquid ammonia in a 1000 ml. round-bottomed flask equipped with a solid carbon dioxide-acetone condenser. After 5 minutes, the blue color was destroyed by passing air into the reaction mixture after which 5.75 g. of sodium metal was added over a period of 5 minutes and the reaction permitted to continue until the blue color had completely disappeared from the gray suspension of sodamide in the liquid ammonia. A solution of 8.77 g. of the m-bis($\alpha$-chlorovinyl)benzene from Example 1, in 100 ml. of anhydrous ether was added dropwise over a period of 20 minutes. After an additional 3 hour period, 100 ml. of water and 50 ml. of pentane were added and most of the ammonia was allowed to evaporate. An additional 150 ml. of water and 150 ml. of pentane were added and the solution was neutralized with aqueous concentrated hydrochloric acid. After separating the acid layer, the organic layer was extracted with water and dried over anhydrous magnesium sulphate. After filtering, solvent removal under vacuum gave 4.68 g. (90 percent isolated yield) of m-diethynylbenzene which was identified by comparison with an authentic sample by vapor phase chromatography and nmr spectroscopy.

Acetophenone was converted to $\alpha$-chlorostyrene by using 12.01 g. of acetophenone in place of the m-diacetylbenzene in Example 1. Likewise, the $\alpha$-chlorostyrene can be converted to phenylacetylene by the procedure of Example 2. Alternatively, both the $\alpha$-chlorostyrene and the m-bis($\alpha$-chlorovinyl)benzene can be dehydrohalogenated by using other known dehydrohalogenating agents in place of sodamide, for example, aqueous or alcoholic sodium or potassium hydroxide, etc.

EXAMPLE 3

Example 1 was repeated except twice the amount (55.64 g.) of triphenylphosphine oxide was used to provide a 1 molar excess of the dichlorotriphenylphosphorane after reaction with the phosgene. Samples were taken during the reaction period at reflux and examined by vapor phase chromatography, infrared and nmr spectroscopy. After approximately 7 hours, the reaction between the ketone and phosphorane were essentially complete since these analyses showed the absence of the acetyl group. At this point in time, the ratio of $\alpha$-chlorovinyl to $\alpha,\alpha$-dichloro-ethyl groups was in the ratio of 93/7. Further heating at reflux caused a gradual shift in this ratio so that it was approximately 95/5 after 9.5 hours, 97/3 after 12 hours, 98/2 after 14 hours and 99/1 after 19 hours. Since both groups are readily dehydrohalogenated to the ethynyl group, the cost of this additional heating must be balanced against the additional cost of the dehydrohalogenating agent required to dehydrohalogenate the $\alpha,\alpha$-dichloroethyl group rather than the $\alpha$-chlorovinyl group.

The reaction mixture was extracted with three 500 ml. portions of pentane and the combined pentane fractions, in turn, were extracted with 300 ml. of methanol containing 50 ml. of aqueous one-normal hydrochloric acid to remove a small amount of triphenylphosphine oxide. The pentane phase was dried with calcium oxide and anhydrous magnesium sulphate after which it was filtered and freed of solvent under vacuum to give 8.85 g. of m-bis($\alpha$-chlorovinyl)-benzene containing 0.44 g. of triphenylphosphine oxide. Dilution of the acetonitrile solution with water precipitated 52.23 g. of triphenylphosphine oxide while 2.01 g. was recovered in the same manner from the acidic aqueous methanol extract. Thus there was recovered 54.68 g. (99 percent) of the initial triphenylphosphine oxide which can be reused.

In a similar manner, p-diacetylbenzene was converted to p-bis($\alpha$-chlorovinyl)benzene and acetylferrocene was converted to $\alpha$-chlorovinylferrocene. When this example was repeated but benzene used in place of the acetonitrile, the reaction was heterogeneous throughout most of the reaction which was extremely slow in comparison to the homogeneous reaction using acetonitrile. Furthermore, a separation of the products were much more difficult since the extraction with pentane could not be used because of its miscibility with benzene.

EXAMPLE 4

This example illustrates the continuous process for conversion of the ketonic acetyl compound to the chloro derivatives. A suspension of 55.64 g. of triphenylphosphine oxide in 100 ml. of anhydrous acetonitrile was reacted with phosgene while stirring and cooling until the evolution of carbon dioxide ceased. During this period, the reaction mixture became completely homogeneous as the dichlorotriphenyl-phosphorane formed. It was heated at reflux for one hour to expel any excess phosgene. After cooling the solution to room temperature, 8.11 g. of m-diacetylbenzene was added and the solution heated at reflux for 22 hours. After cooling, the reaction mixture was extracted with three 500 ml. portions of pentane and in turn the combined pentane phases were extracted with two portions of 300 ml. of methanol containing 50 ml. of aqueous one-normal hydrochloric acid, from which was recovered 3.32 g. of triphenylphosphine oxide. After washing the pentane phase with one 500 ml. portion of water, it was dried over a mixture of calcium oxide and anhydrous magnesium sulphate, filtered and the solvent evaporated under vacuum to give an 86 percent yield of product which was 95.2 percent m-bis($\alpha$-chlorovinyl)benzene and 4.8 percent m-($\alpha,\alpha$-dichloroethyl)-$\alpha$-chlorostyrene.

The acetonitrile layer remaining after extraction with pentane which contained triphenylphosphine oxide and dichlorotriphenylphosphorane was brought up to the initial volume by the addition of 40 ml. of anhydrous acetonitrile. The triphenylphosphine oxide which had been recovered from the methanol extract was not replenished, since at this point in time, the amount had not yet been determined, but preferably, should be added back at this point. Phosgene was introduced into this solution to reconvert all of the triphenylphosphine oxide produced in the above reaction back to dichlorotriphenyl-phosphorane. After refluxing one hour to remove any excess phosgene, 8.11 g. of m-diacetylbenzene was added and the solution refluxed for 22 hours. The above extraction procedure was repeated giving an 88% yield of a chlorinated mixture which was 86.6% m-bis($\alpha$-chlorovinyl)benzene, 11.9% m-($\alpha,\alpha$-dichloroethyl)$\alpha$-chlorostyrene and 1.5% bis($\alpha,\alpha$-dichloroethyl)benzene. Again 3.33 g. of triphenylphosphine oxide was recovered from the acidic methanol extract.

When the reaction mixture described above, which is free of excess phosgene, is heated in a glass-lined autoclave at 180° C., the m-diacetylbenzene is converted in greater than 99 percent yield to m-bis($\alpha$-chlorovinyl)benzene in 1 hour.

EXAMPLE 5

Using a 0.5 molar excess of dichlorotriphenylphosphorane prepared by the procedure described in Example 4, the following reactions were carried out with it and various other ketonic acetyl-containing compounds. Reactions at room temperature were carried out in closed reaction vessels with no stirring being necessary because the solutions were homogeneous at all times. At elevated temperatures, the apparatus described in Example 1 was used. Acetone in a 96 hour reaction at room temperature gave a 63 percent yield of 2-chloropropene and a 5 percent yield of 2,2-dichloropropane with no evidence of any by-products. Methyl ethyl ketone in a 96 hour reaction at room temperature gave a 15 % yield of 2-chloro-1-butene, a 42 percent yield of 2-chloro-2-butene and a 24 percent yield of 2,2-dichlorobutane with no evidence of any by-products. In a reaction at 84° C. for 19 hours, methyl ethyl ketone gave a 19 percent yield of 2-chloro-1-butene, a 64 percent yield of 2-chloro-2-butene and a 10 percent yield of 2,2-dichlorobutane. Acetylacetone in a 19 hour reaction at 84° C. gave an 8 percent yield of 4-chloro-3-penten-2-one, an 83 percent yield of 2,4-dichloro-1,3-pentadiene and a 5 percent yield of 2,2,4-trichloro-4-pentene.

Because of the volatile product of this reaction, the top of the water-cooled reflux condenser was connected to a receiver cooled with a solid carbon dioxide-acetone bath when acetone was reacted at 84° C. for 19 hours. During this time an 85 percent yield of pure 2-chloropropene distilled into the receiver. The reaction mixture remaining in the reactor contained a 6 percent yield of 2,2-dichlororpropane with no evidence of any by-products. This product is readily isolated and the triphenylphosphine oxide reused as described in Example 4. Replacing the reflux condenser with a 10 cm. Vigreux column, and a water-cooled distillation condenser, methyl vinyl ketone (3-buten-2-one) was reacted at 84° C. for 4 hours. During this time, a 32 percent yield of 2-chloro-1,3-butadiene distilled at 58.5°–60.5° C. (literature 59.4° C.) along with a small amount of acetonitrile. The residual reaction mixture contained a 49 percent yield of 1,3-dichloro-2-butene and a 10 percent yield of 1,3-dichloro-3-butene with no evidence of any by-products. These two products are readily isolated and the triphenylphosphine oxide reused as described in Example 4.

EXAMPLE 6

The purpose of this example is to illustrate the effect of solubility and of the R group on reactivity. In order to accomplish this, the reaction conditions were chosen so that no reaction was complete so that the degree of completion is a measure of the relative reactivities. Based on what has been taught previously, it will be readily apparent that changes can be made to improve the yield of any one of the reactions. For example, Examples 3 and 4 show how these teachings have been applied to improving the yields when using dichlorotriphenylphosphorane.

The following reactions were carried out for 17 hours at 84° C. (reflux) using acetonitrile as the solvent and acetophenone as the ketone which, under the reaction conditions used, produces $\alpha$-chlorostyrene as the sole detectable product so that it was used in determining yields.

In all cases, except for the dichlorotri-p-tolylphosphorane, the phosphoranes were made in situ by passing phosgene into the solution of the phosphine oxide until evolution of carbon dioxide was complete after which the solution was refluxed for one hour to expel any excess phosgene. The dichlorotri-p-tolylphosphorane was made by chlorination of tri-p-tolylphosphine dissolved in acetonitrile at room temperature until the yellow color showed excess chlorine was present. This excess chlorine was removed by refluxing the solution for one hour.

Table I shows the amount of reactants and the yield of $\alpha$-chlorostyrene. Except where footnoted, the solutions were homogeneous both at room temperature and at the reaction temperature.

TABLE I

| R in starting R$_3$PO or R$_3$P (amount in g.) | ml. of acetonitrile | g. of acetophenone | yield of $\alpha$-chloro styrene |
|---|---|---|---|
| p-chlorophenyl (3.05) | 15 | 0.9 | 91% (a) |
| phenyl (2.22) | 15 | 0.9 | 63% |
| p-phenoxyphenyl (4.43) | 15 | 0.9 | 47% |
| p-tolyl (2.43) | 15 | 0.9 | 35% |
| $\beta$-naphthyl (3.42) | 15 | 0.9 | 8% (b) |
| n-butyl (2.25) | 20 | 1.2 | 7% |

(a) Heterogeneous at room temperature, soluble at reaction temperature.

(b) Heterogeneous both at room temperature and at reaction temperature.

Although the above examples have illustrated many modifications that can be made in this invention, other variations will be readily apparent to those skilled in the art. For example, other solvents may be used in place of the acetonitrile and other phosphine oxides can be used in place of the particular phosphine oxides used, but would be more expensive and offer no advantage since they would be no more effective. However, stibene oxides, $R_3SbO$, and arsine oxides, $R_3AsO$, can not be used in place of the phosphine oxides, nor can their corresponding dichlorides be used in place of the dichlorophosphoranes. The reaction can be hastened still further, by use of a hydrogen halide acceptor for the hydrogen halide evolved during the reaction, for example, a tertiary amine which is stable under the reaction conditions. These amines also aid in conversion of the gem-dichloride products to the chloroolefin products. Other dehydrohalogenating agents can be used in place of the sodamide of Example 2. These and other variations will be readily apparent to those skilled in the art and are within the full intended scope of the invention as defined by the appended claims.

What I claim as new and desire to secure by Letters Patent of the United States is:

1. The process of converting acetyl substituents to chlorine containing substituents selected from the group consisting of α-chlorovinyl, α-chloroethylidene and α,α-di-chloroethyl substituents in a ketone containing at least one said acetyl substituent as the ketonic moiety, the balance of the molecule having up to 20 carbon atoms and being selected from the group consisting of hydrocarbon, halohydrocarbon, aryl ether and haloaryl ether, which comprises reacting said ketone with a phosphorane having the formula $R_3PCl_2$ where each R is independently selected from the group consisting of $C_{1-20}$ alkyl, phenyl, lower alkyl substituted phenyl, halophenyl, phenoxyphenyl and naphthyl.

2. The process of converting ketonic acetyl substituents to ethynyl substituents which comprises converting the acetyl substituents to chlorine containing substituents by the process of claim 1 and thereafter dehydrohalogenating the chlorine containing substituents to ethynyl substituents with a dehydrohalogenating agent under dehydrohalogenating conditions.

3. The process of using phosgene to convert ketonic acetyl substituents to chlorine containing substituents which comprises reacting phosgene with a phosphine oxide having the formula $R_3PO$ to produce the dichlorophosphorane which then is reacted with a ketone in the process of claim 1.

4. The process of using phosgene to convert ketonic acetyl substituents to ethynyl substituents which comprises reacting phosgene with a phosphine oxide having the formula $R_3PO$ to produce the dichlorophosphorane which then is used in the process of claim 2.

5. The process of claim 1 wherein the ketone is an acetyl benzene.

6. The process of claim 1 wherein the ketone is m-diacetylbenzene, p-diacetylbenzene or mixtures thereof.

7. The process of claim 1 wherein the ketone is an alkyl methyl ketone.

8. The process of claim 1 wherein the ketone is acetone.

9. The process of claim 1 wherein the ketone is an alkenyl methyl ketone.

10. The process of claim 1 wherein the ketone is methyl vinyl ketone.

11. The continuous process for using phosgene to convert ketonic acetyl substituents to chlorine containing substituents which comprises (a) reacting phosgene with a phosphine oxide having the formula $R_3PO$ to produce a dichlorophosphorane having the formula $R_3PCl_2$, (b) using the dichlorophosphorane of (a) in the process of claim 1, using acetonitrile as the solvent for the ketone, (c) extracting the reaction product having chlorine containing substituents from the reaction mixture with a liquid alkane immiscible with acetonitrile, (d) isolating the acetonitrile layer containing the phosphine oxide and (e) recycling the acetonitrile layer to process step (a).

12. The process of claim 11 wherein the each R is phenyl.

13. The process of claim 12 wherein the ketone is an acetylbenzene.

14. The process of claim 12 wherein the ketone is m-diacetylbenzene, p-diacetylbenzene or mixtures thereof.

15. The process of claim 12 wherein the ketone is an alkyl methyl ketone.

16. The process of claim 12 wherein the ketone is acetone.

17. The process of claim 12 wherein the ketone is an alkenyl methyl ketone.

18. The process of claim 12 wherein the ketone is methyl vinyl ketone.

* * * * *